US008973659B2

(12) United States Patent
Karadkar et al.

(10) Patent No.: US 8,973,659 B2
(45) Date of Patent: Mar. 10, 2015

(54) DEGRADABLE POLYMER AND LEGUME PARTICULATES FOR WELL TREATMENT

(75) Inventors: Prasad Baburao Karadkar, Vadagaon (IN); Yogesh Kumar Choudhary, Sarwar (IN); Vijaya Kumar Patnana, Visakhapatnam (IN)

(73) Assignee: Halliburton Energy Services, Inc., Houston, TX (US)

( * ) Notice: Subject to any disclaimer, the term of this patent is extended or adjusted under 35 U.S.C. 154(b) by 208 days.

(21) Appl. No.: 13/476,151

(22) Filed: May 21, 2012

(65) Prior Publication Data

US 2013/0306317 A1    Nov. 21, 2013

(51) Int. Cl.
E21B 43/16    (2006.01)
(52) U.S. Cl.
USPC ....................................... 166/305.1; 166/270
(58) Field of Classification Search
USPC ..................... 166/305.1, 308.1, 270
See application file for complete search history.

(56) References Cited

U.S. PATENT DOCUMENTS

| | | | |
|---|---|---|---|
| 5,246,602 A * | 9/1993 | Forrest | 166/283 |
| 6,016,871 A | 1/2000 | Burts, Jr. | |
| 7,096,947 B2 | 8/2006 | Todd et al. | |
| 7,506,689 B2 | 3/2009 | Surjaatmadja et al. | |
| 2005/0170973 A1 | 8/2005 | Verret | |
| 2005/0205265 A1 | 9/2005 | Todd | |
| 2006/0065397 A1 | 3/2006 | Nguyen | |
| 2007/0277981 A1 * | 12/2007 | Robb et al. | 166/300 |
| 2010/0004146 A1 | 1/2010 | Panga et al. | |
| 2011/0120712 A1 | 5/2011 | Todd et al. | |
| 2012/0305245 A1 | 12/2012 | Loiseau et al. | |

OTHER PUBLICATIONS

The International Search Report, PCT/US2013/038196, dated Aug. 13, 2013, 5 pages.
Penny, Glenn S. "Fluid Leakoff" in Recent Advances in Hydraulic Fracturing.
Williamson, C.D. "A New Nondamaging Particulate Fluid-Loss Additive" in SPE 18474, Feb. 1989.
Schlumberger MaxCO3 Acid, 2010.
McDuff, Darren. "Understanding Wormholes in Carbonates: Unprecedented Experimental Scale and 3D Visualization" in SPE 129329, 2010.
Gdanski, R.D. "Kinetics of the Primary Reaction of HF on Alumino-Silicates" in SPE 66564, Mar. 1997.
Barragan, Ernesto. "Cleanup Acid System for Gravel-Pack Completions Without Increasing Water Production" in SPE 123869, 2009.
Glasbergen, Gerard. "The Optimum Injection Rate for Wormhole Propagation: Myth or Reality?" in SPE 121464, 2009.
Kalia, Nikita. "Wormhole Formation in Carbonates under Varying Temperature Conditions" in SPE 121803, 2009.
Mora, Jose A. "The Challenge of Producing and Stimulating a Deep Sandstone-Carbonate Reservoir with Combined Organic and Inorganic Formation Damage" in SPE 121008, 2009.

(Continued)

*Primary Examiner* — Catherine Lokith
(74) *Attorney, Agent, or Firm* — Craig W. Roddy; Baker Botts L.L.P.

(57) ABSTRACT

A method of treating a treatment zone in a well is provided, the method including the steps of: (A) forming a treatment fluid comprising: (i) a degradable polymer particulate; (ii) a legume particulate; and (iii) a continuous liquid phase; and (B) introducing the treatment fluid into the treatment zone of the well. The invention can be used, for example, for leak-off control or fluid diversion purposes.

20 Claims, 7 Drawing Sheets

HPHT fluid-loss control test in constant rate mode.

(56) References Cited

OTHER PUBLICATIONS

Gdanski, R. "Recent Advances in Carbonate Stimulation" in IPTC 10693, 2005.

Navarette, R.C. "Dynamic Fluid Loss in Hydraulic Fracturing Under Realistic Shear Conditions in High-Permeability Rocks" in SPE 28529, Sep. 1994.

Navarette, R.C. "Experiments in Fluid Loss and Formation Damage with Xanthan-Based Fluids While Drilling" in SPE 62732, Sep. 2000.

Simonides, Hylke. "Role of Designing Nondamaging Completion and Drilling Fluids" in SPE 73768, Feb. 2002.

* cited by examiner

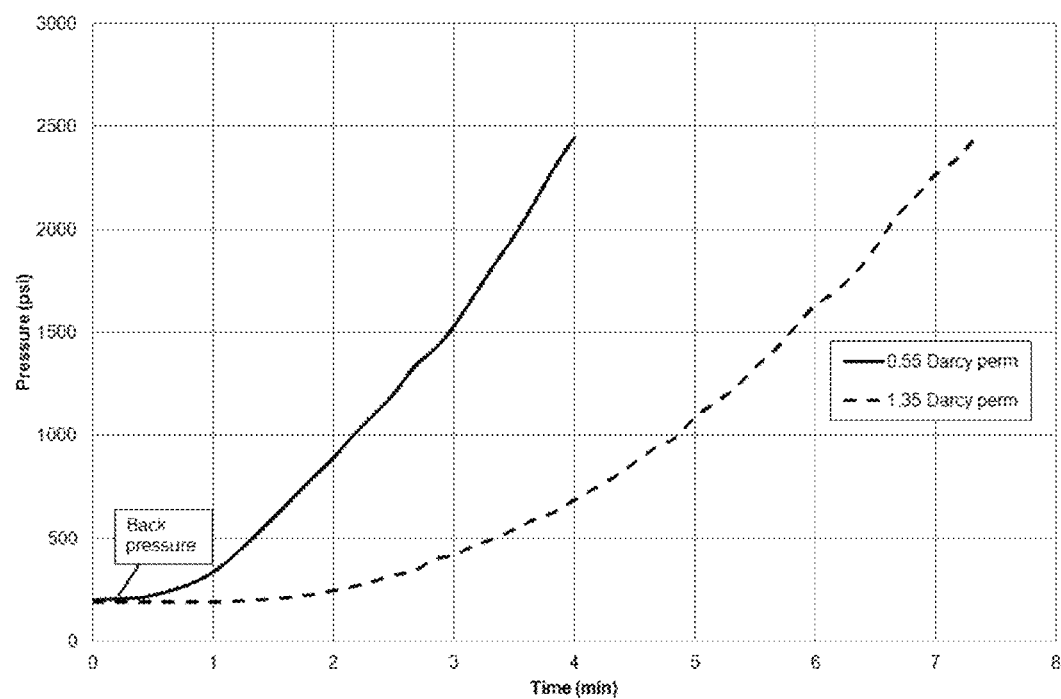
Figure 1: HPHT fluid-loss control test in constant rate mode.

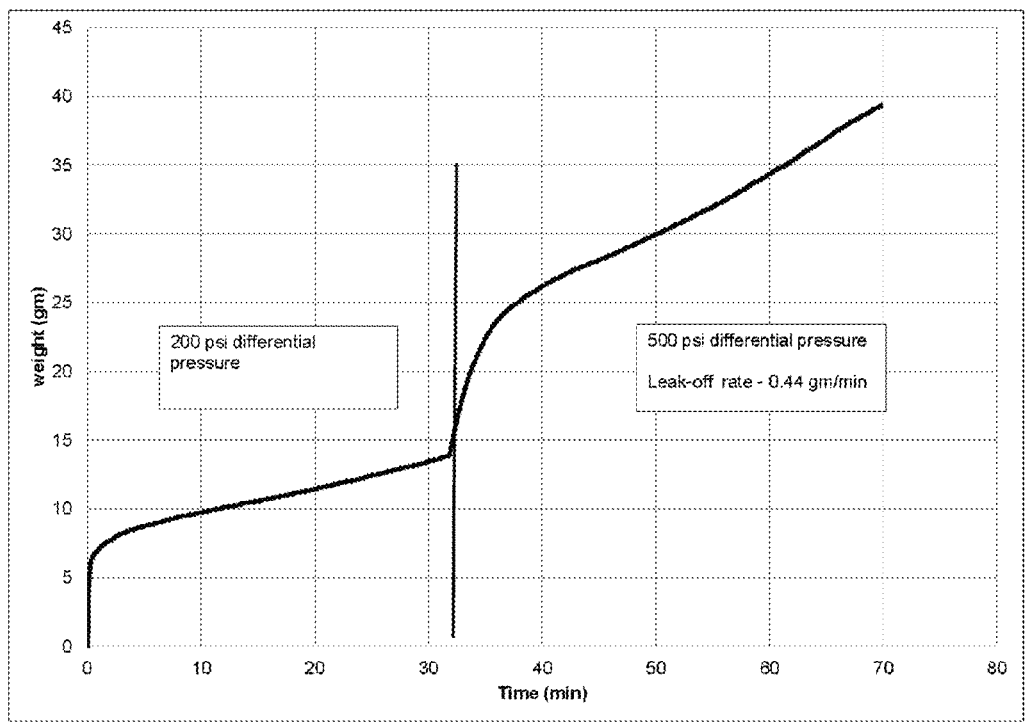
Figure 2: HPHT fluid-loss control test in constant pressure mode.

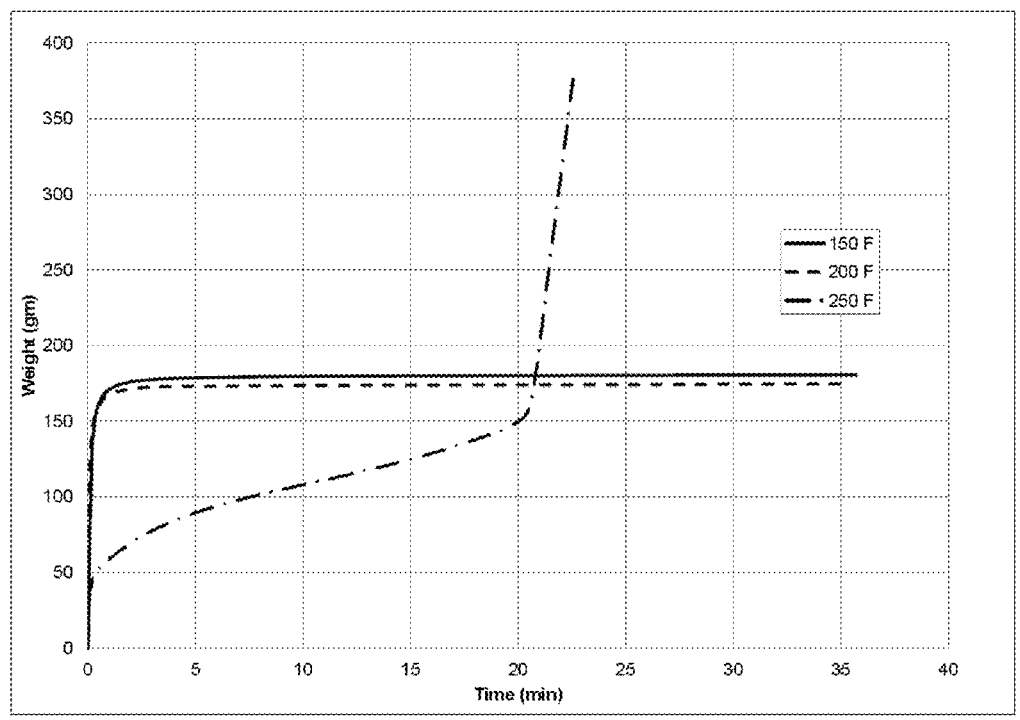
Figure 3: Filtration rates at 150 °F, 200 °F, and 250 °F.

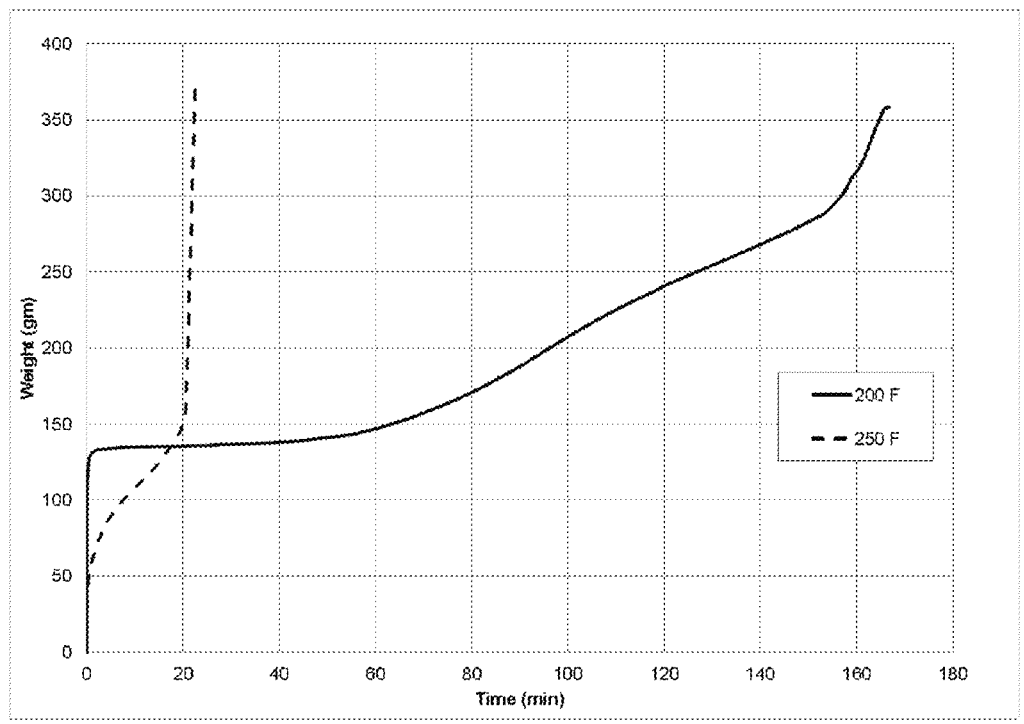
Figure 4: Polylactide-soy blend cake stability at 200 °F and 250 °F.

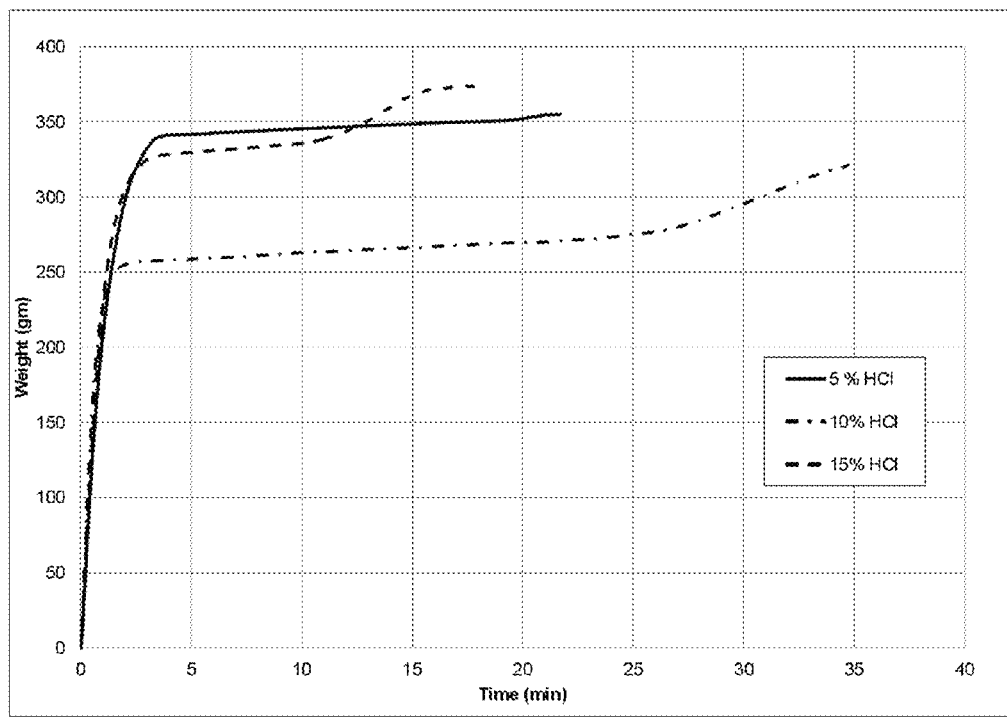
Figure 5: Filter cake of acid gel in constant pressure mode at 200 °F.

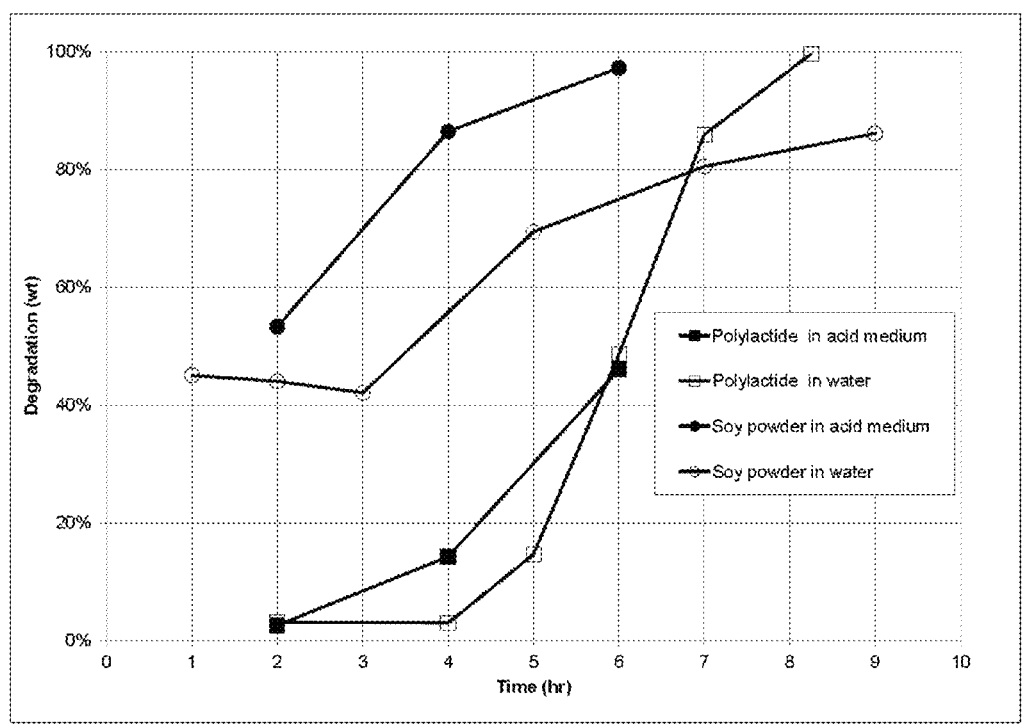
Figure 6: Degradation of polylactide 150 mesh or soy powder at 250 °F in 5% HCl or water.

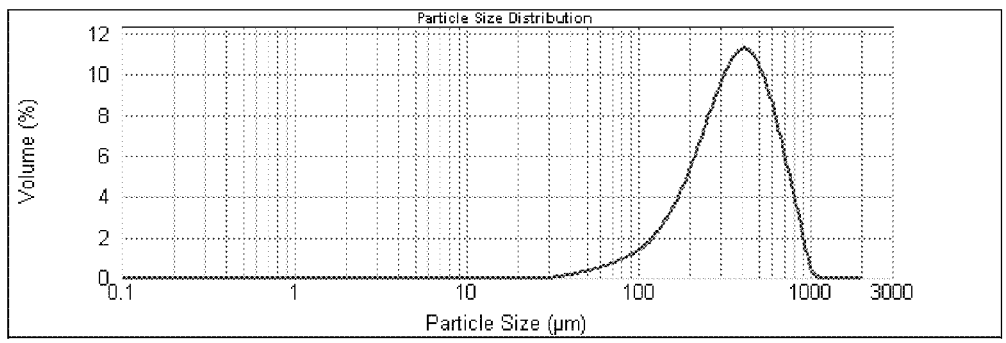
Figure 7: Particle size distribution analysis of polylactide polymer particulate.
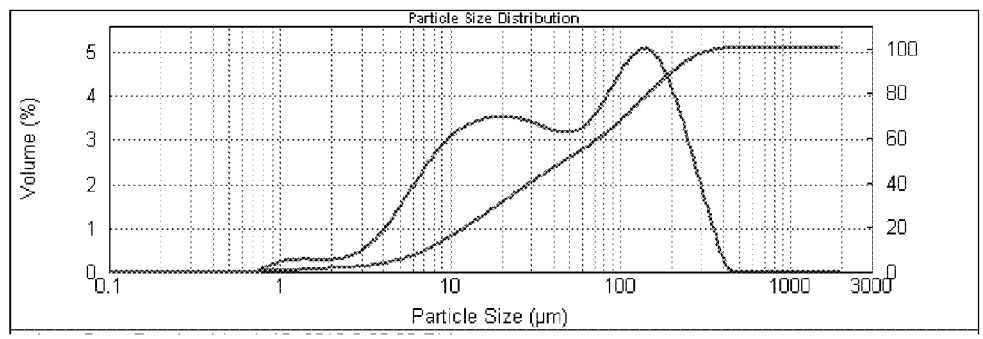
Figure 8: Particle size distribution analysis of a soy powder.

DEGRADABLE POLYMER AND LEGUME PARTICULATES FOR WELL TREATMENT

CROSS-REFERENCE TO RELATED APPLICATIONS

Not applicable.

TECHNICAL FIELD

The inventions are in the field of producing crude oil or natural gas from subterranean formations. More specifically, the inventions generally relate to methods for leak-off control or diversion applications in a well.

BACKGROUND ART

Oil & Gas Wells

In the context of production from a well, oil and gas are understood to refer to crude oil and natural gas. Oil and gas are naturally occurring hydrocarbons in certain subterranean formations.

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

There are conventional and non-conventional types of reservoirs. In a conventional reservoir, the hydrocarbons flow to the wellbore in a manner that can be characterized by flow through permeable media, where the permeability may or may not have been altered near the wellbore, or flow through permeable media to a permeable (conductive), bi-wing fracture placed in the formation. A conventional reservoir would typically have a matrix permeability greater than about 1 milliDarcy (equivalent to about 1,000 microDarcy). In a non-conventional reservoir, the permeability is less than 1 milliDarcy. Non-conventional reservoirs include tight gas, shale, and coal bed methane.

To produce oil or gas, a well is drilled into a subterranean formation that is an oil or gas reservoir. Generally, the greater the depth of the formation, the higher the bottomhole static temperature and pressure of the formation.

A wellbore can be used as a production or injection wellbore. A production wellbore is used to produce hydrocarbons from the reservoir. An injection wellbore is used to inject a fluid, e.g., liquid water or steam, to drive oil or gas to a production wellbore.

Well Servicing and Well Fluids

Generally, well services include a wide variety of operations that may be performed in oil, gas, geothermal, or water wells, such as drilling, cementing, completion, and intervention. Well services are designed to facilitate or enhance the production of desirable fluids such as oil or gas from or through a subterranean formation.

Well services can include various types of treatments that are commonly performed in a wellbore or subterranean formation. For example, during completion or intervention, stimulation is a type of treatment performed to enhance or restore the productivity of oil and gas from a well. Stimulation treatments fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Other types of completion or intervention treatments can include, for example, gravel packing, consolidation, and controlling excessive water production, and controlling sand or fines production. Still other types of completion or intervention treatments include, but are not limited to, damage removal, formation isolation, wellbore cleanout, scale removal, and scale control. Of course, other well treatments and treatment fluids are known in the art.

Hydraulic Fracturing

Hydraulic fracturing is a common stimulation treatment. The purpose of a fracturing treatment is to provide an improved flow path for oil or gas to flow from the hydrocarbon-bearing formation to the wellbore. A treatment fluid adapted for this purpose is sometimes referred to as a fracturing fluid. The fracturing fluid is pumped at a sufficiently high flow rate and pressure into the wellbore and into the subterranean formation to create or enhance one or more fractures in the subterranean formation. Creating a fracture means making a new fracture in the formation. Enhancing a fracture means enlarging a pre-existing fracture in the formation.

The formation or extension of a fracture in hydraulic fracturing may initially occur suddenly. When this happens, the fracturing fluid suddenly has a fluid flow path through the fracture to flow more rapidly away from the wellbore. As soon as the fracture is created or enhanced, the sudden increase in the flow of fluid away from the well reduces the pressure in the well. Thus, the creation or enhancement of a fracture in the formation may be indicated by a sudden drop in fluid pressure, which may be observable at the wellhead. After initially breaking down the formation, the fracture may then propagate more slowly, at the same pressure or with little pressure increase. It can also be detected with seismic techniques.

A newly-created or newly-extended fracture will tend to close together after the pumping of the fracturing fluid is stopped. To prevent the fracture from closing, a material is usually placed in the fracture to keep the fracture propped open and to provide higher fluid conductivity than the matrix of the formation. A material used for this purpose is referred to as a proppant.

A proppant is in the form of a solid particulate, which can be suspended in the fracturing fluid, carried downhole, and deposited in the fracture to form a proppant pack. The proppant pack props the fracture in an open condition while allowing fluid flow through the permeability of the pack. The proppant pack in the fracture provides a higher-permeability flow path for the oil or gas to reach the wellbore compared to the permeability of the matrix of the surrounding subterranean formation. This higher-permeability flow path increases oil and gas production from the subterranean formation.

A particulate for use as a proppant is usually selected based on the characteristics of size range, crush strength, and solid stability in the types of fluids that are encountered or used in wells. Preferably, a proppant should not melt, dissolve, or otherwise degrade from the solid state under the downhole conditions.

The proppant is selected to be an appropriate size to prop open the fracture and bridge the fracture width expected to be created by the fracturing conditions and the fracturing fluid. If the proppant is too large, it will not easily pass into a fracture and will screenout too early. If the proppant is too small, it will not provide the fluid conductivity to enhance production. See, for example, McGuire and Sikora, 1960. In the case of fracturing relatively permeable or even tight-gas reservoirs, a proppant pack should provide higher permeability than the matrix of the formation. In the case of fracturing ultra-low permeable formations, such as shale formations, a proppant pack should provide for higher permeability than the naturally occurring fractures or other micro-fractures of the fracture complexity.

Appropriate sizes of particulate for use as a proppant are typically in the range from about 8 to about 100 U.S. Standard Mesh. A typical proppant is sand-sized, which geologically is defined as having a largest dimension ranging from about 0.06 millimeters up to about 2 millimeters (mm). (The next smaller particle size class below sand sized is silt, which is defined as having a largest dimension ranging from less than about 0.06 mm down to about 0.004 mm.) As used herein, proppant does not mean or refer to suspended solids, silt, fines, or other types of insoluble solid particulate smaller than about 0.06 mm (about 230 U.S. Standard Mesh). Further, it does not mean or refer to particulates larger than about 3 mm (about 7 U.S. Standard Mesh).

The proppant is sufficiently strong, that is, has a sufficient compressive or crush resistance, to prop the fracture open without being deformed or crushed by the closure stress of the fracture in the subterranean formation. For example, for a proppant material that crushes under closure stress, a 20/40 mesh proppant preferably has an API crush strength of at least 4,000 psi closure stress based on 10% crush fines according to procedure API RP-56. A 12/20 mesh proppant material preferably has an API crush strength of at least 4,000 psi closure stress based on 16% crush fines according to procedure API RP-56. This performance is that of a medium crush-strength proppant, whereas a very high crush-strength proppant would have a crush-strength of about 10,000 psi. In comparison, for example, a 100-mesh proppant material for use in an ultra-low permeable formation such as shale preferably has an API crush strength of at least 5,000 psi closure stress based on 6% crush fines. The higher the closing pressure of the formation of the fracturing application, the higher the strength of proppant is needed. The closure stress depends on a number of factors known in the art, including the depth of the formation.

Further, a suitable proppant should be stable over time and not dissolve in fluids commonly encountered in a well environment. Preferably, a proppant material is selected that will not dissolve in water or crude oil.

Suitable proppant materials include, but are not limited to, sand (silica), ground nut shells or fruit pits, sintered bauxite, glass, plastics, ceramic materials, processed wood, resin coated sand or ground nut shells or fruit pits or other composites, and any combination of the foregoing. Mixtures of different kinds or sizes of proppant can be used as well. In conventional reservoirs, if sand is used, it commonly has a median size anywhere within the range of about 20 to about 100 U.S. Standard Mesh. For a synthetic proppant, it commonly has a median size anywhere within the range of about 8 to about 100 U.S. Standard Mesh.

The concentration of proppant in the treatment fluid depends on the nature of the subterranean formation. As the nature of subterranean formations differs widely, the concentration of proppant in the treatment fluid may be in the range of from about 0.03 kilograms to about 12 kilograms of proppant per liter of liquid phase (from about 0.1 lb/gal to about 25 lb/gal).

Carrier Fluid for Particulate

A well fluid can be adapted to be a carrier fluid for particulates.

For example, a proppant used in fracturing or a gravel used in gravel packing may have a much different density than the carrier fluid. For example, sand has a specific gravity of about 2.7, whereas water has a specific gravity of 1.0 at Standard Laboratory conditions of temperature and pressure. A proppant or gravel having a different density than water will tend to separate from water very rapidly.

As many well fluids are water-based, partly for the purpose of helping to suspend particulate of higher density, and for other reasons known in the art, the density of the fluid used in a well can be increased by including highly water-soluble salts in the water, such as potassium chloride. However, increasing the density of a well fluid will rarely be sufficient to match the density of the particulate.

Increasing Viscosity of Fluid for Suspending Particulate

Increasing the viscosity of a well fluid can help prevent a particulate having a different specific gravity than an external phase of the fluid from quickly separating out of the external phase.

A viscosity-increasing agent can be used to increase the ability of a fluid to suspend and carry a particulate material in a well fluid. A viscosity-increasing agent can be used for other purposes, such as matrix diversion, conformance control, or friction reduction.

A viscosity-increasing agent is sometimes referred to in the art as a viscosifying agent, viscosifier, thickener, gelling agent, or suspending agent. In general, any of these refers to an agent that includes at least the characteristic of increasing the viscosity of a fluid in which it is dispersed or dissolved. There are several kinds of viscosity-increasing agents and related techniques for increasing the viscosity of a fluid.

In general, because of the high volume of fracturing fluid typically used in a fracturing operation, it is desirable to efficiently increase the viscosity of fracturing fluids to the desired viscosity using as little viscosity-increasing agent as possible. In addition, relatively inexpensive materials are preferred. Being able to use only a small concentration of the viscosity-increasing agent requires a lesser amount of the viscosity-increasing agent in order to achieve the desired fluid viscosity in a large volume of fracturing fluid.

Polymers for Increasing Viscosity

Certain kinds of polymers can be used to increase the viscosity of a fluid. In general, the purpose of using a polymer is to increase the ability of the fluid to suspend and carry a particulate material. Polymers for increasing the viscosity of a fluid are preferably soluble in the external phase of a fluid. Polymers for increasing the viscosity of a fluid can be naturally occurring polymers such as polysaccharides, derivatives of naturally occurring polymers, or synthetic polymers.

Treatment fluids used in high volumes, such as fracturing fluids, are usually water-based. Efficient and inexpensive viscosity-increasing agents for water include certain classes of water-soluble polymers.

As will be appreciated by a person of skill in the art, the dispersibility or solubility in water of a certain kind of polymeric material may be dependent on the salinity or pH of the water. Accordingly, the salinity or pH of the water can be modified to facilitate the dispersibility or solubility of the water-soluble polymer. In some cases, the water-soluble polymer can be mixed with a surfactant to facilitate its dispersibility or solubility in the water or salt solution utilized.

The water-soluble polymer can have an average molecular weight in the range of from about 50,000 to 20,000,000, most preferably from about 100,000 to about 4,000,000. For example, guar polymer is believed to have a molecular weight in the range of about 2 to about 4 million.

Typical water-soluble polymers used in well treatments include water-soluble polysaccharides and water-soluble synthetic polymers (e.g., polyacrylamide). The most common water-soluble polysaccharides employed in well treatments are guar and its derivatives.

As used herein, a "polysaccharide" can broadly include a modified or derivative polysaccharide. As used herein, "modified" or "derivative" means a compound or substance formed by a chemical process from a parent compound or substance, wherein the chemical skeleton of the parent is retained in the derivative. The chemical process preferably includes at most a few chemical reaction steps, and more preferably only one or two chemical reaction steps. As used herein, a "chemical reaction step" is a chemical reaction between two chemical reactant species to produce at least one chemically different species from the reactants (regardless of the number of transient chemical species that may be formed during the reaction). An example of a chemical step is a substitution reaction. Substitution on a polymeric material may be partial or complete.

A polymer can be classified as being single chain or multi chain, based on its solution structure in aqueous liquid media. Examples of single-chain polysaccharides that are commonly used in the oilfield industry include guar, guar derivatives, and cellulose derivatives. Guar polymer, which is derived from the beans of a guar plant, is referred to chemically as a galactomannan gum. Examples of multi-chain polysaccharides include xanthan, diutan, and scleroglucan, and derivatives of any of these. Without being limited by any theory, it is currently believed that the multi-chain polysaccharides have a solution structure similar to a helix or are otherwise intertwined.

Xanthan gum (commonly referred to simply as xanthan) is a polysaccharide, derived from the bacterial coat of *Xanthomonas campestris*. It is produced by fermentation of glucose, sucrose, or lactose by the *Xanthomonas campestris* bacterium. After a fermentation period, the polysaccharide is precipitated from a growth medium with isopropyl alcohol, dried, and ground into a fine powder. Later, it is added to a liquid medium to form the gum.

As used herein, the term "clarified xanthan" refers to a xanthan that has a flow rate of at least about 200 ml in 2 minutes at ambient temperature in a filtering laboratory test on a Baroid Filter Press using 40 psi of differential pressure and a 9 cm Whatman No. 4 filter paper having a 2.7 micrometer pore size. In some cases, clarified xanthans may have been obtained by treating xanthan with methods involving enzymes or any other suitable method, inter alia, to remove any debris, for example, residual cellular structures, such as cell walls, from a non-clarified, standard xanthan. Clarified xanthans can be obtained by genetic engineering or bacteria selection. In still other cases, the clarified xanthan may be obtained by chemical treatment or derivatization of a xanthan. An example of such a modification would be an oxidized or hydrolyzed xanthan.

Diutan gum (commonly referred to simply as diutan) is a multi-chain polysaccharide that is sometimes used to increase viscosity in well fluids. In general, diutan is a polysaccharide which may be prepared by fermentation of a strain of sphingomonas.

The term "clarified diutan" as used herein refers to a diutan that has improved turbidity or filtration properties as compared to non-clarified diutan. In some embodiments, suitable clarified diutans may have been treated with enzymes or the like to remove residual cellular structures, such as cell walls. In some embodiments, suitable clarified diutans may be produced from genetically modified or bioengineered strains of bacteria or other strains of bacteria that allow the clarified diutan to have improved functional properties such as filterability, turbidity, etc.

A fluid viscosified with a diutan or derivatized diutan can enable a substantial amount of design flexibility for a number of applications that would benefit using a shear-thinning, low-damage fluid system including, for example, gravel packing, fluid-loss control, and friction pressure reduction.

A fluid viscosified with a diutan or derivatized diutan can enable a simple mixing procedure and rapid viscosity development in a number of water-based fluids including for example, fresh water, potassium or sodium chloride brines, and sodium bromide brines. The polymer can be rapidly dispersed in an aqueous phase without going through a complex mixing protocol or an extended hydration period. Its ease of mixing and rapid hydration apply to seawater and monovalent brines used in completion operations.

Diutan viscosified fluid can provide excellent particulate suspension under static conditions at temperatures up to 270° F. (132.2° C.). It is a shear thinning fluid having relatively low viscosity at high shear rates and high viscosity at low shear rates.

Because such fluids have high viscosity under low shear conditions, it can be useful to suspend particulates similar to a fluid viscosified with a cross-linked polymer. In addition, the high viscosities under low shear attained with these polymer loadings can be used to help control fluid losses during workover and completion operations with reduced damage to the formation.

The viscosity-increasing agent can be provided in any form that is suitable for the particular treatment fluid or application. For example, the viscosity-increasing agent can be provided as a liquid, gel, suspension, or solid additive that is admixed or incorporated into a treatment fluid.

The viscosity-increasing agent should be present in a treatment fluid in a form and in an amount at least sufficient to impart the desired viscosity to a treatment fluid. For example, the amount of viscosity-increasing agent used in the treatment fluids may vary from about 0.25 pounds per 1,000 gallons of treatment fluid ("lbs/Mgal") to about 200 lbs/Mgal. In other embodiments, the amount of viscosity-increasing agent included in the treatment fluids may vary from about 10 lbs/Mgal to about 80 lbs/Mgal. In another embodiment, about 20 pounds to about 70 pounds (lbs) of water-soluble polymer per 1,000 gallons (Mgal) of water (equivalent to about 2.4 g/L to about 8.4 g/L).

Crosslinking of Polymer to Increase Viscosity of a Fluid or Form a Gel

The viscosity of a fluid at a given concentration of viscosity-increasing agent can be greatly increased by crosslinking the viscosity-increasing agent. A crosslinking agent, sometimes referred to as a crosslinker, can be used for this purpose. A crosslinker interacts with at least two polymer molecules to form a "crosslink" between them.

If crosslinked to a sufficient extent, the polysaccharide may form a gel with water. Gel formation is based on a number of factors including the particular polymer and concentration thereof, the particular crosslinker and concentration thereof, the degree of crosslinking, temperature, and a variety of other factors known to those of ordinary skill in the art.

Sometimes, however, crosslinking is undesirable, as it may cause the polymeric material to be more difficult to break and it may leave an undesirable residue in the formation.

Viscosifying Surfactants (i.e. Viscoelastic Surfactants)

It should be understood that merely increasing the viscosity of a fluid may only slow the settling or separation of distinct phases and does not necessarily stabilize the suspension of any particles in the fluid.

Certain viscosity-increasing agents can also help suspend a particulate material by increasing the elastic modulus of the fluid. The elastic modulus is the measure of a substance's tendency to be deformed non-permanently when a force is applied to it. The elastic modulus of a fluid, commonly referred to as G', is a mathematical expression and defined as the slope of a stress versus strain curve in the elastic deformation region. G' is expressed in units of pressure, for example, Pa (Pascals) or dynes/cm$^2$. As a point of reference, the elastic modulus of water is negligible and considered to be zero.

An example of a viscosity-increasing agent that is also capable of increasing the suspending capacity of a fluid is to use a viscoelastic surfactant. As used herein, the term "viscoelastic surfactant" refers to a surfactant that imparts or is capable of imparting viscoelastic behavior to a fluid due, at least in part, to the association of surfactant molecules to form viscosifying micelles.

Viscoelastic surfactants may be cationic, anionic, or amphoteric in nature. The viscoelastic surfactants can comprise any number of different compounds, including methyl ester sulfonates, hydrolyzed keratin, sulfosuccinates, taurates, amine oxides, ethoxylated amides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), derivatives thereof, and combinations thereof.

Matrix Diversion

Matrix treatments in conventional reservoirs can utilize matrix diversion. For example, in subterranean treatments in conventional reservoirs, it is often desired to treat an interval of a subterranean formation having sections of varying permeability, reservoir pressures or varying degrees of formation damage, and thus may accept varying amounts of certain treatment fluids. For example, low reservoir pressure in certain areas of a subterranean formation or a rock matrix or a proppant pack of high permeability may permit that portion to accept larger amounts of certain treatment fluids. It may be difficult to obtain a uniform distribution of the treatment fluid throughout the entire interval. For instance, the treatment fluid may preferentially enter portions of the interval with low fluid flow resistance at the expense of portions of the interval with higher fluid flow resistance. In some instances, these intervals with variable flow resistance may be water-producing intervals.

Fluid-Loss Control

Fluid loss refers to the undesirable leakage of a fluid phase of any type of well fluid into the permeable matrix of a zone, which zone may or may not be a treatment zone. Fluid-loss control refers to treatments designed to reduce such undesirable leakage. Providing effective fluid-loss control for well fluids during certain stages of well operations is usually highly desirable.

The usual approach to fluid-loss control is to substantially reduce the permeability of the matrix of the zone with a fluid-loss control material that blocks the permeability at or near the face of the rock matrix of the zone. For example, the fluid-loss control material may be a particulate that has a size selected to bridge and plug the pore throats of the matrix. All else being equal, the higher the concentration of the appropriately sized particulate, the faster bridging will occur. As the fluid phase carrying the fluid-loss control material leaks into the formation, the fluid-loss control material bridges the pore throats of the matrix of the formation and builds up on the surface of the borehole or fracture face or penetrates only a little into the matrix. The buildup of solid particulate or other fluid-loss control material on the walls of a wellbore or a fracture is referred to as a filter cake. Depending on the nature of a fluid phase and the filter cake, such a filter cake may help block the further loss of a fluid phase (referred to as a filtrate) into the subterranean formation. A fluid-loss control material is specifically designed to lower the volume of a filtrate that passes through a filter medium.

After application of a filter cake, however, it may be desirable to restore permeability into the formation. If the formation permeability of the desired producing zone is not restored, production levels from the formation can be significantly lower. Any filter cake or any solid or polymer filtration into the matrix of the zone resulting from a fluid-loss control treatment must be removed to restore the formation's permeability, preferably to at least its original level. This is often referred to as clean up.

A variety of fluid-loss control materials have been used and evaluated for fluid-loss control and clean-up, including foams, oil-soluble resins, acid-soluble solid particulates, graded salt slurries, linear viscoelastic polymers, and heavy metal-crosslinked polymers. Their respective comparative effects are well documented.

Fluid-loss control materials are sometimes used in drilling fluids or in treatments that have been developed to control fluid loss. A fluid-loss control pill is a treatment fluid that is designed or used to provide some degree of fluid-loss control. Through a combination of viscosity, solids bridging, and cake buildup on the porous rock, these pills oftentimes are able to substantially reduce the permeability of a zone of the subterranean formation to fluid loss. They also generally enhance filter-cake buildup on the face of the formation to inhibit fluid flow into the formation from the wellbore.

Fluid-loss control pills typically comprise an aqueous base fluid and a high concentration of a viscosifying agent (usually crosslinked), and sometimes, bridging particles, like graded sand, graded salt particulate, or sized calcium carbonate particulate.

Fluid Damage to Proppant Pack or Matrix Permeability

In well treatments using viscous well fluids, the material for increasing the viscosity of the fluid can damage the permeability of the proppant pack or the matrix of the subterranean formation. For example, a fracturing fluid can include a polymeric material that is deposited in the fracture or within the matrix. By way of another example, the fluid may include surfactants that leave unbroken micelles in the fracture or change the wettability of the formation in the region of the fracture.

Breakers are utilized in many treatments to mitigate fluid damage in the formation. However, breakers and other treatments are subject to variability of results, they add expense and complication to a fracture treatment, and in can still leave at least some fluid damage in the formation.

Breaker for Viscosity of Fluid

After a treatment fluid is placed where desired in the well and for the desired time, the fluid usually must be removed from the wellbore or the formation. For example, in the case of hydraulic fracturing, the fluid should be removed leaving the proppant in the fracture and without damaging the conductivity of the proppant bed. To accomplish this removal, the viscosity of the treatment fluid must be reduced to a very low viscosity, preferably near the viscosity of water, for optimal removal from the propped fracture. Similarly, when a viscosified fluid is used for gravel packing, the viscosified fluid must be removed from the gravel pack.

Reducing the viscosity of a viscosified treatment fluid is referred to as "breaking" the fluid. Chemicals used to reduce the viscosity of well fluids are called breakers.

No particular mechanism is necessarily implied by the term. For example, a breaker can reduce the molecular weight of a water-soluble polymer by cutting the long polymer chain. As the length of the polymer chain is cut, the viscosity of the fluid is reduced. For instance, reducing the guar polymer molecular weight to shorter chains having a molecular weight of about 10,000 converts the fluid to near water-thin viscosity. This process can occur independently of any crosslinking bonds existing between polymer chains.

Unfortunately, another complicating factor exists. Because of the large size of the polymer, a filtration process can occur upon the face of a formation or fracture in conventional formation. A filtercake of the polymer can be formed while the aqueous fluid, KCl, and breakers pass into the matrix of the formation. Careful examination of this filtercake, which may be formed from crosslinked or uncrosslinked guar or other polymer, reveals a semi-elastic, rubberlike membrane. Once the polymer concentrates, it is difficult to solubilize the polymer. Nonfiltercake fluid consists of approximately 99.5 percent water and 0.5 percent polymer. Accordingly, for example, when the fracture closes in a fracturing treatment, the permeability of the proppant bed or the formation face may be severely damaged by the polymer filtercake. Viscosified gravel pack fluids need breakers, too. They may or may not form a filtercake on the formation face.

Acidizing Treatment

A widely used stimulation technique is acidizing, in which a treatment fluid including an aqueous acid solution is introduced into the formation to dissolve acid-soluble materials. In this way, hydrocarbon fluids can more easily flow from the formation into the well. In addition, an acid treatment can facilitate the flow of injected treatment fluids from the well into the formation.

Acidizing techniques can be carried out as matrix acidizing procedures or as acid fracturing procedures.

In matrix acidizing, an acidizing fluid is injected from the well into the formation at a rate and pressure below the pressure sufficient to create a fracture in the formation. In sandstone formations, the acid primarily removes or dissolves acid soluble damage in the near wellbore region and is thus classically considered a damage removal technique and not a stimulation technique. In carbonate formations, the goal is to actually a stimulation treatment where in the acid forms conducted channels called wormholes in the formation rock. Greater details, methodology, and exceptions can be found in "Production Enhancement with Acid Stimulation" $2^{nd}$ edition by Leonard Kalfayan (PennWell 2008), SPE 129329, SPE 123869, SPE 121464, SPE 121803, SPE 121008, IPTC 10693, 66564-PA, and the references contained therein.

In acid fracturing, an acidizing fluid is pumped into a carbonate formation at a sufficient pressure to cause fracturing of the formation and creating differential (non-uniform) etching fracture conductivity. Greater details, methodology, and exceptions can be found in "Production Enhancement with Acid Stimulation" $2^{nd}$ edition by Leonard Kalfayan (PennWell 2008), SPE 129329, SPE 123869, SPE 121464, SPE 121803, SPE 121008, IPTC 10693, 66564-PA, and the references contained therein.

SUMMARY OF THE INVENTION

A method of treating a treatment zone in a well is provided, the method including the steps of: (A) forming a treatment fluid including: (i) a degradable polymer particulate; (ii) a legume particulate; and (iii) a continuous liquid phase; and (B) introducing the treatment fluid into the treatment zone of the well. The invention can be used, for example, for leak-off control or fluid diversion purposes.

In an embodiment, a method of treating a treatment zone in a well is provided, the method including the steps of: (A) forming a treatment fluid including: (i) a degradable polymer particulate; (ii) a legume particulate, wherein the d(50) particle size of the legume particulate is smaller than the d(50) particle size of the degradable polymer particulate; (iii) a continuous liquid phase that is water-based; and (iv) a viscosity-increasing agent; (B) introducing the treatment fluid into the treatment zone, wherein the treatment zone has a permeability in the range of 500 milliDarcy to 7 Darcy and the treatment zone has a natural fractures varying from 0.1 mm to 3 mm width.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

BRIEF DESCRIPTION OF THE DRAWING

The accompanying drawing is incorporated into the specification to help illustrate examples according to the presently most-preferred embodiment of the invention.

FIG. 1 is a graph of a HPHT fluid-loss control test in constant rate mode.

FIG. 2 is a graph of a HPHT fluid-loss control test in constant pressure mode.

FIG. 3 is a graph of filtration rates at 150° F., 200° F., and 250° F.

FIG. 4 is a graph of polylactide-soy blend cake stability at 200° F. and 250° F.

FIG. 5 is a graph of a filter cake from an acid gel in constant pressure mode at 200° F.

FIG. 6 is a graph of the degradation of polylactide particulate 150 mesh or soy powder 80 mesh observed at 250° F. in 5% HCl or water.

FIG. 7 is a particle size distribution analysis of polylactide polymer particulate on a semi-logarithmic scale.

FIG. 8 is a particle size distribution analysis of a soy powder on a semi-logarithmic scale, showing the distribution and cumulative percentage of particles.

DETAILED DESCRIPTION OF PRESENTLY PREFERRED EMBODIMENTS AND BEST MODE

Definitions and Usages

Interpretation

The words or terms used herein have their plain, ordinary meaning in the field of this disclosure, except to the extent explicitly and clearly defined in this disclosure.

If there is any conflict in the usages of a word or term in this disclosure and one or more patent(s) or other documents that may be incorporated by reference, the definitions that are consistent with this specification should be adopted.

Patent Terms

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

Well Terms

In the context of production from a well, oil and gas are understood to refer to crude oil and natural gas. Oil and gas are naturally occurring hydrocarbons in certain subterranean formations.

A "subterranean formation" is a body of rock that has sufficiently distinctive characteristics and is sufficiently continuous for geologists to describe, map, and name it.

A subterranean formation having a sufficient porosity and permeability to store and transmit fluids is sometimes referred to as a "reservoir."

As used herein, a subterranean formation having greater than 50% by weight of inorganic carbonates (e.g., limestone or dolomite) is referred to as a "carbonate formation".

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

A "well" includes a wellhead and at least one wellbore from the wellhead penetrating the earth. The "wellhead" is the surface termination of a wellbore, which surface may be on land or on a seabed. A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well. The "borehole" usually refers to the inside wellbore wall, that is, the rock face or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

As used herein, introducing "into a well" means introduced at least into and through the wellhead. According to various techniques known in the art, tubulars, equipment, tools, or well fluids can be directed from the wellhead into any desired portion of the wellbore. Additionally, a well fluid can be directed from a portion of the wellbore into the rock matrix of a zone.

As used herein, a "well fluid" broadly refers to any fluid adapted to be introduced into a well for any purpose. A well fluid can be, for example, a drilling fluid, a cementing composition, a treatment fluid, or a spacer fluid. If a well fluid is to be used in a relatively small volume, for example less than about 200 barrels (32 m$^3$), it is sometimes referred to in the art as a wash, dump, slug, or pill.

As used herein, the word "treatment" refers to any treatment for changing a condition of a portion of a wellbore or an adjacent subterranean formation; however, the word "treatment" does not necessarily imply any particular treatment purpose. A treatment usually involves introducing a well fluid for the treatment, in which case it may be referred to as a treatment fluid, into a well. As used herein, a "treatment fluid" is a fluid used in a treatment. Unless the context otherwise requires, the word "treatment" in the term "treatment fluid" does not necessarily imply any particular treatment or action by the fluid.

Broadly, a zone refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." As used herein, a "treatment zone" refers to an interval of rock along a wellbore into which a well fluid is directed to flow from the wellbore. As used herein, "into a treatment zone" means into and through the wellhead and, additionally, through the wellbore and into the treatment zone.

The term "design temperature" refers to an estimate or measurement of the actual temperature at the down hole environment at the time of a well treatment. That is, design temperature takes into account not only the bottom hole static temperature ("BHST"), but also the effect of the temperature of the well fluid on the BHST during treatment. Because treatment fluids may be considerably cooler than BHST, the difference between the two temperatures can be quite large. Ultimately, if left undisturbed, a subterranean formation will return to the BHST.

The near-wellbore region of a zone is usually considered to include the matrix of the rock within a few inches of the borehole. As used herein, the near-wellbore region of a zone is considered to be anywhere within about 12 inches of the wellbore. The far-field region of a zone is usually considered the matrix of the rock that is beyond the near-wellbore region.

Physical States and Phases

As used herein, "phase" is used to refer to a substance having a chemical composition and physical state that is distinguishable from an adjacent phase of a substance having a different chemical composition or different physical state.

Unless otherwise stated, the physical state or phase of a substance (or mixture of substances) and other physical properties are determined at a temperature of 77° F. (25° C.) and a pressure of 1 atmosphere (Standard Laboratory Conditions) without applied shear.

Particle Terms

As used herein, unless the context otherwise requires, a "particle" refers to a body having a finite mass and sufficient cohesion such that it can be considered as an entity but having relatively small dimensions. A particle can be of any size ranging from molecular scale to macroscopic, depending on context.

A particle can be in any physical state. For example, a particle of a substance in a solid state can be as small as a few molecules on the scale of nanometers up to a large particle on the scale of a few millimeters, such as large grains of sand. Similarly, a particle of a substance in a liquid state can be as small as a few molecules on the scale of nanometers or a large drop on the scale of a few millimeters. A particle of a substance in a gas state is a single atom or molecule that is separated from other atoms or molecules such that intermolecular attractions have relatively little effect on their respective motions.

As used herein, "particulate" or "particulate material" refers to matter in the physical form of distinct particles. A particulate is a grouping of particles based on common characteristics, including chemical composition and particle size range, particle size distribution, or median particle size. As used herein, a particulate is a grouping of particles having similar chemical composition and particle size ranges anywhere in the range of about 1 micrometer (e.g., microscopic clay or silt particles) up to about 5 millimeters.

A particulate will have a particle size distribution ("PSD"). As used herein, "the size" of a particulate can be determined by methods known to persons skilled in the art.

A particulate can be of solid or liquid particles. As used herein, however, unless the context otherwise requires, particulate refers to a solid particulate. Of course, a solid particulate is a particulate of particles that are in the solid physical state, that is, the constituent atoms, ions, or molecules are sufficiently restricted in their relative movement to result in a fixed shape for each of the particles.

A common approach to define the particle size distribution width is to cite three values, the d(0.10), d(0.50), and the d(0.90). The d(0.50), which is sometimes referred to as the "D50" or the median particle size, is defined as the diameter where half of the particles are smaller and half are larger than the size. Similarly, 10 percent of the distribution lies below the d(0.10) or "D10" size, and 90 percent of the distribution lies below the d(0.90) or "D90" size.

One way to measure the approximate particle size distribution of a solid particulate is with graded screens. A solid particulate material will pass through some specific mesh (that is, have a maximum size; larger pieces will not fit through this mesh) but will be retained by some specific tighter mesh (that is, a minimum size; pieces smaller than this will pass through the mesh). This type of description establishes a range of particle sizes. A "+" before the mesh size indicates the particles are retained by the sieve, while a "−" before the mesh size indicates the particles pass through the sieve. For example, −70/+140 means that 90% or more of the particles will have mesh sizes between the two values.

Particulate materials are sometimes described by a single mesh size, for example, 100 U.S. Standard mesh. If not otherwise stated, a reference to a single particle size means the mid-point of the industry-accepted mesh size range for the particulate.

Particulate smaller than about 400 U.S. Standard Mesh is usually measured or separated according to other methods because small forces such as electrostatic forces can interfere with separating tiny particulate sizes using a wire mesh.

Dispersions

A dispersion is a system in which particles of a substance of one chemical composition and physical state are dispersed in another substance of a different chemical composition or physical state. In addition, phases can be nested. If a substance has more than one phase, the most external phase is referred to as the continuous phase of the substance as a whole, regardless of the number of different internal phases or nested phases.

A dispersion can be classified a number of different ways, including based on the size of the dispersed particles, the uniformity or lack of uniformity of the dispersion, and, if a fluid, whether or not precipitation occurs.

Classification of Dispersions: Heterogeneous and Homogeneous

A dispersion is considered to be heterogeneous if the dispersed particles are not dissolved and are greater than about 1 nanometer in size. (For reference, the diameter of a molecule of toluene is about 1 nm).

Heterogeneous dispersions can have gas, liquid, or solid as an external phase. An example of a suspension of solid particulate dispersed in a gas phase would be an aerosol, such as smoke. In a case where the dispersed-phase particles are liquid in an external phase that is another liquid, this kind of heterogeneous dispersion is more particularly referred to as an emulsion. Suspensions and emulsions are commonly used as well fluids.

A dispersion is considered to be homogeneous if the dispersed particles are dissolved in solution or the particles are less than about 1 nanometer in size. Even if not dissolved, a dispersion is considered to be homogeneous if the dispersed particles are less than about 1 nanometer in size.

Classification of Heterogeneous Dispersions: Suspensions and Colloids

Heterogeneous dispersions can be further classified based on the dispersed particle size.

A heterogeneous dispersion is a "suspension" where the dispersed particles are larger than about 50 micrometer. Such particles can be seen with a microscope, or if larger than about 50 micrometers (0.05 mm), with the unaided human eye. The dispersed particles of a suspension in a liquid external phase may eventually separate on standing, e.g., settle in cases where the particles have a higher density than the liquid phase. Suspensions having a liquid external phase are essentially unstable from a thermodynamic point of view; however, they can be kinetically stable over a long period depending on temperature and other conditions.

A heterogeneous dispersion is a "colloid" where the dispersed particles range up to about 50 micrometer (50,000 nanometers) in size. The dispersed particles of a colloid are so small that they settle extremely slowly, if ever.

Classification of Homogeneous Dispersions: Solutions

A solution is a special type of homogeneous mixture. A solution is considered homogeneous: (a) because the ratio of solute to solvent is the same throughout the solution; and (b) because solute will never settle out of solution, even under powerful centrifugation, which is due to intermolecular attraction between the solvent and the solute. An aqueous solution, for example, saltwater, is a homogenous solution in which water is the solvent and salt is the solute.

One may also refer to the solvated state, in which a solute ion or molecule is complexed by solvent molecules. A chemical that is dissolved in solution is in a solvated state. The solvated state is distinct from dissolution and solubility. Dissolution is a kinetic process, and is quantified by its rate. Solubility quantifies the concentration of the solute at which there is dynamic equilibrium between the rate of dissolution and the rate of precipitation of the solute. Dissolution and solubility can be dependent on temperature and pressure, and may be dependent on other factors, such as salinity or pH of an aqueous phase.

Solubility Terms

A substance is considered to be "soluble" in a liquid if at least 10 grams of the substance can be dissolved in one liter of the liquid when tested at 77° F. and 1 atmosphere pressure for 2 hours and considered to be "insoluble" if less soluble than this.

As will be appreciated by a person of skill in the art, the hydratability, dispersibility, or solubility of a substance in water can be dependent on the salinity, pH, or other substances in the water. Accordingly, the salinity, pH, and additive selection of the water can be modified to facilitate the hydratability, dispersibility, or solubility of a substance in aqueous solution. To the extent not specified, the hydratability, dispersibility, or solubility of a substance in water is determined in deionized water, at neutral pH, and without any other additives.

Fluids

A fluid can be a single phase or a dispersion. In general, a fluid is an amorphous substance that is or has a continuous phase of particles that are smaller than about 1 micrometer that tends to flow and to conform to the outline of its container.

Examples of fluids are gases and liquids. A gas (in the sense of a physical state) refers to an amorphous substance that has a high tendency to disperse (at the molecular level) and a relatively high compressibility. A liquid refers to an amorphous substance that has little tendency to disperse (at the molecular level) and relatively high incompressibility. The tendency to disperse is related to Intermolecular Forces (also known as van der Waal's Forces). (A continuous mass of a particulate, e.g., a powder or sand, can tend to flow as a fluid depending on many factors such as particle size distribution, particle shape distribution, the proportion and nature of any wetting liquid or other surface coating on the particles, and many other variables. Nevertheless, as used herein, a fluid does not refer to a continuous mass of particulate as the sizes of the solid particles of a mass of a particulate are too large to be appreciably affected by the range of Intermolecular Forces.)

As used herein, a fluid is a substance that behaves as a fluid under Standard Laboratory Conditions, that is, at 77° F. (25° C.) temperature and 1 atmosphere pressure, and at the higher temperatures and pressures usually occurring in subterranean formations without any applied shear.

Every fluid inherently has at least a continuous phase. A fluid can have more than one phase. The continuous phase of a well fluid is a liquid under Standard Laboratory Conditions. For example, a well fluid can in the form of be a suspension (solid particles dispersed in a liquid phase), an emulsion (liquid particles dispersed in another liquid phase), or a foam (a gas phase dispersed in liquid phase).

As used herein, a water-based fluid means that water or an aqueous solution is the dominant material, that is, greater than 50% by weight, of the continuous phase of the substance.

In contrast, "oil-based" means that oil is the dominant material by weight of the continuous phase of the substance. In this context, the oil of an oil-based fluid can be any oil. In general, an oil is any substance that is liquid Standard Laboratory Conditions, is hydrophobic, and soluble in organic solvents. Oils have a high carbon and hydrogen content and are relatively non-polar substances, for example, having a polarity of 3 or less on the Synder polarity index. This general definition includes classes such as petrochemical oils, vegetable oils, and many organic solvents. All oils can be traced back to organic sources.

Apparent Viscosity of a Fluid

Viscosity is a measure of the resistance of a fluid to flow. In everyday terms, viscosity is "thickness" or "internal friction." Thus, pure water is "thin," having a relatively low viscosity whereas honey is "thick," having a relatively higher viscosity. Put simply, the less viscous the fluid is, the greater its ease of movement (fluidity). More precisely, viscosity is defined as the ratio of shear stress to shear rate.

A Newtonian fluid (named after Isaac Newton) is a fluid for which stress versus strain rate curve is linear and passes through the origin. The constant of proportionality is known as the viscosity. Examples of Newtonian fluids include water and most gases. Newton's law of viscosity is an approximation that holds for some substances but not others.

Non-Newtonian fluids exhibit a more complicated relationship between shear stress and velocity gradient (i.e., shear rate) than simple linearity. Thus, there exist a number of forms of non-Newtonian fluids. Shear thickening fluids have an apparent viscosity that increases with increasing the rate of shear. Shear thinning fluids have a viscosity that decreases with increasing rate of shear. Thixotropic fluids become less viscous over time at a constant shear rate. Rheopectic fluids become more viscous over time at a constant sear rate. A Bingham plastic is a material that behaves as a solid at low stresses but flows as a viscous fluid at high stresses.

Most well fluids are non-Newtonian fluids. Accordingly, the apparent viscosity of a fluid applies only under a particular set of conditions including shear stress versus shear rate, which must be specified or understood from the context. In the oilfield and as used herein, unless the context otherwise requires it is understood that a reference to viscosity is actually a reference to an apparent viscosity. Apparent viscosity is commonly expressed in units of centipoise ("cP").

Like other physical properties, the viscosity of a Newtonian fluid or the apparent viscosity of a non-Newtonian fluid may be highly dependent on the physical conditions, primarily temperature and pressure.

Gels and Deformation

The physical state of a gel is formed by a network of interconnected molecules, such as a crosslinked polymer or a network of micelles. The network gives a gel phase its structure and an apparent yield point. At the molecular level, a gel is a dispersion in which both the network of molecules is continuous and the liquid is continuous. A gel is sometimes considered as a single phase.

Technically, a "gel" is a semi-solid, jelly-like physical state or phase that can have properties ranging from soft and weak to hard and tough. Shearing stresses below a certain finite value fail to produce permanent deformation. The minimum shear stress that will produce permanent deformation is referred to as the shear strength or gel strength of the gel.

In the oil and gas industry, however, the term "gel" may be used to refer to any fluid having a viscosity-increasing agent, regardless of whether it is a viscous fluid or meets the technical definition for the physical state of a gel. For example, a "base gel" is a term used in the field for a fluid that includes a viscosity-increasing agent, such as guar, but that excludes crosslinking agents. Typically, a base gel is mixed with another fluid containing a crosslinker, wherein the mixture is adapted to form a crosslinked gel. Similarly, a "crosslinked gel" may refer to a substance having a viscosity-increasing agent that is crosslinked, regardless of whether it is a viscous fluid or meets the technical definition for the physical state of a gel.

Permeability

Permeability refers to how easily fluids can flow through a material. For example, if the permeability is high, then fluids will flow more easily and more quickly through the material. If the permeability is low, then fluids will flow less easily and more slowly through the material. As used herein, "high permeability" means the material has a permeability of at least 100 milliDarcy (mD). As used herein, "low permeability" means the material has a permeability of less than 1 mD.

General Measurement Terms

Unless otherwise specified or unless the context otherwise clearly requires, any ratio or percentage means by weight.

Unless otherwise specified or unless the context otherwise requires, the phrase "by weight of the water", means the weight of the water of the continuous phase of the fluid without the weight of any viscosity-increasing agent, dissolved salt, suspended particulate, or other materials or additives that may be present in the water.

Any doubt regarding whether units are in U.S. or Imperial units, where there is any difference, U.S. units are intended. For example, "gal/Mgal" means U.S. gallons per thousand U.S. gallons.

The micrometer (µm) may sometimes referred to herein as a micron.

Unless otherwise stated, mesh sizes are in U.S. Standard Mesh.

Degradable Solid Material

As used herein, a "degradable" solid material is capable of undergoing an irreversible degradation downhole. The term "irreversible" as used herein means that the degradable material once degraded should not recrystallize or reconsolidate while downhole in the treatment zone, that is, the degradable material should degrade in situ but should not recrystallize or reconsolidate in situ.

The terms "degradable" or "degradation" refer to both the two relatively extreme cases of degradation that the degradable material may undergo, that is, heterogeneous (or bulk erosion) and homogeneous (or surface erosion), and any stage of degradation in between these two.

Preferably, the degradable material degrades slowly over time as opposed to instantaneously.

The degradable material is preferably "self-degrading." As referred to herein, the term "self-degrading" means bridging may be removed without the need to circulate a separate "clean up" solution or "breaker" into the treatment zone, wherein such clean up solution or breaker having no purpose other than to degrade the bridging in the proppant pack. Though "self-degrading," an operator may nevertheless elect to circulate a separate clean up solution through the well bore and into the treatment zone under certain circumstances, such as when the operator desires to hasten the rate of degradation. In certain embodiments, a degradable material is sufficiently acid-degradable as to be removed by such treatment.

The degradation can be a result of, inter alia, a chemical or thermal reaction or a reaction induced by radiation. The degradable material is preferably selected to degrade by at least one mechanism selected from the group consisting of: hydrolysis, hydration followed by dissolution, dissolution, decomposition, or sublimation.

The choice of degradable material can depend, at least in part, on the conditions of the well, e.g., wellbore temperature. For instance, lactides can be suitable for lower temperature wells, including those within the range of about 60° F. to about 150° F., and polylactides can be suitable for well bore temperatures above this range.

General Objectives

The purpose of this invention is to disclose a composition relating to leak-off control or diversion of fluids in a well. More particularly, an objective was to develop a composition for forming a filtercake in a high-permeability formation (about 500 mD up to about 7,000 mD). After use, the filtercake should degrade at the design temperature. Most preferably, it should self-degrade.

Preferably, the composition is useful in an acidizing fluid. For example, an aqueous phase of the fluid can have a pH less than 4.5. This can be useful, for example, in the acidizing of a carbonate formation.

A method of treating a treatment zone in a well is provided, the method including the steps of: (A) forming a treatment fluid comprising: (i) a degradable polymer particulate; (ii) a legume particulate; and (iii) a continuous liquid phase; and (B) introducing the treatment fluid into the treatment zone of the well.

It is believed that using a combination of different particulates, preferably with different particle size distributions, would work better in a high-permeability formation. A problem, however, is that obtaining smaller particulate sizes of such degradable polymer particulate can be difficult.

Therefore, a new composition was developed including of a mixture of a degradable polymer particulate, such as a polylactide, and soy powder. It is also believed that other legume particulates would have similar characteristics and uses, although soy powder is the most widely available and typically of lower cost than other legume particulates.

A blend of polylactide particulate and soy powder was tried in high perm filter disc under high-pressure, high-temperature ("HPHT") conditions and it worked well. The new composition provided very good leak-off control and sustained a differential pressure as high as 2400 psi.

The present technology is a fluid composition including a degradable polymer particulate, such as polylactide, and a legume powder, such as a soy powder. This combination provides an excellent fluid-loss material as a self-degrading diverting composition in high permeability subterranean formations (e.g., 500 milliDarcy up to 7 Darcy).

Such a fluid composition can help provide effective diversion during a variety of well-treatment operations, including, for example, matrix acidizing or acid fracturing of carbonate formations.

The bridging particulates can be added to a treatment fluid in an amount necessary to give the desired fluid-loss control. In some embodiments, a fluid-loss additive may be included in an amount of about 5 to about 200 lbs/Mgal of the treatment fluid. In some embodiments, the fluid-loss additive may be included in an amount from about 10 to about 50 lbs/Mgal of the treatment fluid.

Selection of Degradable Particulate

In general, selection of a degradable material and treatment fluid depends on a number of factors including: (1) the degradability of the material; (2) the particle size of the degradable material; (3) the pH of the treatment fluid, if water-based; (4) the design temperature; and (5) the loading of degradable material in the treatment fluid.

In choosing the appropriate degradable material, the degradation products that will result should also be considered. For example, the degradation products should not adversely affect other operations or components in the well. As an example of this consideration, a boric acid derivative is preferably not included as a degradable material in the fracturing fluids where such fluids utilize xanthan as the viscosifier because boric acid and xanthan are generally incompatible. One of ordinary skill in the art, with the benefit of this disclosure, will be able to recognize when potential components of the fracturing fluids would be incompatible or would produce degradation products that would adversely affect other operations or components.

It is to be understood that a degradable material can include mixtures of two or more different degradable compounds.

Degradable Polymer Particulate

As for degradable polymers, a polymer is considered to be "degradable" herein if the degradation is due to, inter alia, chemical or radical process such as hydrolysis, oxidation, enzymatic degradation, or UV radiation. The degradability of a polymer depends at least in part on its backbone structure. For instance, the presence of hydrolyzable or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how the polymer degrades, e.g., temperature, presence of moisture, oxygen, microorganisms, enzymes, pH, and the like. The degradable polymer particulate can be biodegradable.

Some examples of degradable polymers are disclosed in U.S. Patent Publication No. 2010/0267591, having for named inventors Bradley L. Todd and Trinidad Munoz, which is incorporated herein by reference.

Additional examples of degradable polymers include but are not limited to those described in the publication of Advances in Polymer Science, Vol. 157 entitled "Degradable Aliphatic Polyesters" edited by A.-C. Albertsson and the publication "Biopolymers" Vols. 1-10, especially Vol. 3b, Polyester II: Properties and Chemical Synthesis and Vol. 4, Polyester III: Application and Commercial Products edited by Alexander Steinbuchel, Wiley-VCM.

Non-limiting examples of degradable materials include, but are not limited to aromatic polyesters and aliphatic polyesters. Such polyesters may be linear, graft, branched, crosslinked, block, dendritic, homopolymers, random, block, and star- and hyper-branched aliphatic polyesters, etc.

Some suitable polymers include poly(hydroxy alkanoate) (PHA); poly(alpha-hydroxy) acids such as polylactic acid (PLA), polyglycolic acid (PGA), polylactide, and polyglycolide; poly(beta-hydroxy alkanoates) such as poly(beta-hydroxy butyrate) (PHB) and poly(beta-hydroxybutyrates-co-beta-hydroxyvelerate) (PHBV); poly(omega-hydroxy alkanoates) such as poly(beta-propiolactone) (PPL) and poly(ε-caprolactone) (PCL); poly(alkylene dicarboxylates) such as poly(ethylene succinate) (PES), poly(butylene succinate) (PBS); and poly(butylene succinate-co-butylene adipate); polyanhydrides such as poly(adipic anhydride); poly(orthoesters); polycarbonates such as poly(trimethylene carbonate); and poly(dioxepan-2-one)]; aliphatic polyesters; poly(lactides); poly(glycolides); poly(ε-caprolactones); poly(hydroxybutyrates); poly(anhydrides); aliphatic polycarbonates; poly(orthoesters); poly(amino acids); poly(ethylene oxides); and polyphosphazenes. Of these suitable polymers, aliphatic polyesters and polyanhydrides are preferred. Derivatives of the above materials may also be suitable; in particular, derivatives that have added functional groups that may help control degradation rates.

Aliphatic polyesters degrade chemically, inter alia, by hydrolytic cleavage. Hydrolysis can be catalyzed by acids, bases, enzymes, or metal salt catalyst solutions. Generally, during the hydrolysis, carboxylic end groups are formed during chain scission, and this may enhance the rate of further hydrolysis. This mechanism is known in the art as "autocatalysis," and is thought to make polyester matrices more bulk eroding. Suitable aliphatic polyesters have the general formula of repeating units shown below:

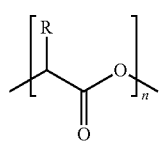

Formula I where n is an integer above 75 and more preferably between 75 and 10,000 and R is selected from the group consisting of hydrogen, alkyl, aryl, alkylaryl, acetyl, heteroatoms, and mixtures thereof.

Of the suitable aliphatic polyesters, poly(lactide) is preferred. Poly(lactide) is synthesized either from lactic acid by a condensation reaction or more commonly by ring-opening polymerization of cyclic lactide monomer. Since both lactic acid and lactide can achieve the same repeating unit, the general term poly(lactic acid) as used herein refers to formula I without any limitation as to how the polymer was made such as from lactides, lactic acid, or oligomers, and without reference to the degree of polymerization or level of plasticization.

The lactide monomer exists generally in three different forms: two stereoisomers L- and D-lactide and racemic D,L-lactide (meso-lactide). The oligomers of lactic acid and oligomers of lactide are defined by the formula:

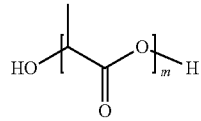

Formula II where m is an integer 2≤m≤75. Preferably m is an integer and 2≤m≤10. These limits correspond to number average molecular weights below about 5,400 and below about 720, respectively. The chirality of the lactide units provides a means to adjust, inter alia, degradation rates, as well as physical and mechanical properties. Poly(L-lactide), for instance, is a semicrystalline polymer with a relatively slow hydrolysis rate. This could be desirable in applications where a slower degradation of the degradable material is desired. Poly(D,L-lactide) may be a more amorphous polymer with a resultant faster hydrolysis rate. This may be suitable for other applications where a more rapid degradation may be appropriate. The stereoisomers of lactic acid may be used individually or combined. Additionally, they may be copolymerized with, for example, glycolide or other monomers like ε-caprolactone, 1,5-dioxepan-2-one, trimethylene carbonate, or other suitable monomers to obtain polymers with different properties or degradation times. Additionally, the lactic acid stereoisomers can be modified to be used by, among other things, blending, copolymerizing or otherwise mixing the stereoisomers, blending, copolymerizing or otherwise mixing high and low molecular weight polylactides, or by blending, copolymerizing or otherwise mixing a polylactide with another polyester or polyesters. See U.S. application Publication Nos. 2005/0205265 and 2006/0065397, incorporated herein by reference. One skilled in the art would recognize the utility of oligomers of other organic acids that are polyesters.

Polycondensation reactions, ring-opening polymerizations, free radical polymerizations, anionic polymerizations, carbocationic polymerizations, coordinative ring-opening polymerization, and any other suitable process may prepare such suitable polymers.

One suitable commercially available low-density degradable polymer particulate comprising 90 to 100% polylactide and having a specific gravity of about 1.25. It is commonly available in at least two sizes, 150 mesh and 320 mesh.

Legume Particulate

As used herein, a legume is the seed of a leguminous plant, which is in a two-halved case that splits along both sides when ripe and having the seeds attached to one edge of the valves.

Legumes soften in water. Without being limited by any theory, it is believed this can help in binding the degradable polymer particles together.

Legumes are a low cost natural product. Legumes can be food grade material. Therefore, they are environmentally friendly, degradable, and have no toxicity issues.

Soy is a species of legume seed crop and it is widely used for vegetable oil production. Soybean powder is available worldwide. For example, soy powder is commonly available in a particle size of about 80 mesh (up to about 177 micron); however, unlike for commercially available degradable polymer particulates, a soy powder has a particle distribution that includes large portions of much smaller particulate sizes. Thus, even for the same nominal mesh size, a soy powder is believed to have a much smaller d(50) than a degradable polymer particulate.

Selecting Particulate Sizes

The sizes of the degradable polymer and the legume particulates are preferably selected to facilitate bridging to form a low-porosity filter cake.

In an embodiment, the degradable polymer particulate and the legume particulate have particulate sizes have a d(50) that are different by at least a factor of 2. Preferably, the legume particulate has a d(50) that is at least one-half the d(50) of the degradable polymer particulate.

In an embodiment, the particle size distribution of the degradable polymer particulate is larger than the particle size distribution of the legume particulate.

In an embodiment, the degradable polymer particulate has a particle size in the range of 0.005 millimeter to 5 millimeter. In another embodiment, the legume particulate has a particle size in the range of 0.005 millimeter to 0.5 millimeter.

In addition, it is believed that the particle shapes of these particulates are substantially spherical or globular. According to a preferred embodiment of the invention, no other special shapes are desired or required.

It should be understood that the degradable polymer and legume particulates are of insufficient particle strengths and other properties for use as a proppant.

Continuous Liquid Phase

The treatment fluid is preferably a water-based fluid wherein the continuous aqueous phase of the fluid is greater than 50% by weight water.

Preferably, the water is present in the treatment fluids in an amount at least sufficient to substantially hydrate any viscosity-increasing agent. In some embodiments, the aqueous phase, including the dissolved materials therein, may be present in the treatment fluids in an amount in the range from about 5% to 100% by volume of the treatment fluid.

Preferably, the water for use in the treatment fluid does not contain anything that would adversely interact with the other components used in the well fluid or with the subterranean formation.

The aqueous phase can include freshwater or non-freshwater. Non-freshwater sources of water can include surface water ranging from brackish water to seawater, brine, returned water (sometimes referred to as flowback water) from the delivery of a well fluid into a well, unused well fluid, and produced water. As used herein, brine refers to water having at least 40,000 mg/L total dissolved solids.

In some embodiments, the aqueous phase of the treatment fluid may comprise a brine. The brine chosen should be compatible with the formation and should have a sufficient density to provide the appropriate degree of well control.

Salts may optionally be included in the treatment fluids for many purposes. For example, salts may be added to a water source, for example, to provide a brine, and a resulting treatment fluid, having a desired density. Salts may optionally be included for reasons related to compatibility of the treatment fluid with the formation and formation fluids. To determine whether a salt may be beneficially used for compatibility purposes, a compatibility test may be performed to identify potential compatibility problems. From such tests, one of ordinary skill in the art with the benefit of this disclosure will be able to determine whether a salt should be included in a treatment fluid.

Suitable salts can include, but are not limited to, calcium chloride, sodium chloride, magnesium chloride, potassium chloride, sodium bromide, potassium bromide, ammonium chloride, sodium formate, potassium formate, cesium formate, mixtures thereof, and the like. The amount of salt that should be added should be the amount necessary for formation compatibility, such as stability of clay minerals, taking into consideration the crystallization temperature of the brine, e.g., the temperature at which the salt precipitates from the brine as the temperature drops.

Viscosity-Increasing Agent

A viscosity-increasing agent can be included in the treatment fluid to help suspend the particulates. If appropriate, the viscosity-increasing agent may be crosslinked. In addition, the treatment fluid may include a breaker for the viscosity-increasing agent.

Removal of Undesirable Crosslinking Cations

Brines and other water sources may include those that comprise monovalent, divalent, or multivalent cations. Some divalent or trivalent cations, such as magnesium, calcium, iron, and zirconium, may, in some concentrations and at some pH levels, cause undesirable crosslinking of a polymeric viscosity-increasing agent, if present. In some cases, such crosslinking may be problematic because, inter alia, it may cause filtration problems, injection problems, or causes regain permeability problems.

If a water source is used which contains such divalent or trivalent cations in concentrations sufficiently high to be problematic, then such divalent or trivalent salts may be removed, either by a process such as reverse osmosis, or by raising the pH of the water in order to precipitate out such salts to lower the concentration of such salts in the water before the water is used.

Another method would be to include a chelating agent to chemically bind the problematic ions to prevent their undesirable interactions with the diutan. As used herein, the term "chelating agent" or "chelant" also refers to sequestering agents and the like. Suitable chelants include, but are not limited to, citric acid or sodium citrate. Other chelating agents also are suitable.

In some embodiments, the treatment fluid may optionally comprise a chelating agent. When added to the treatment fluids, the chelating agent may chelate any dissolved iron (or other divalent or trivalent cation) that may be present in the aqueous fluid. Such chelating may prevent such ions from crosslinking the viscosity-increasing agent molecules.

Any suitable chelating agent may be used. Examples of suitable chelating agents include, but are not limited to, an anhydrous form of citric acid, commercially available under the tradename "Fe-2™" Iron Sequestering Agent from Halliburton Energy Services, Inc., of Duncan, Okla. Another example of a suitable chelating agent is a solution of citric acid dissolved in water, commercially available under the tradename "Fe-2A™" buffering agent from Halliburton Energy Services, Inc., of Duncan, Okla. Other chelating agents include, inter alia, nitrilotriacetic acid ("NTA"), any form of ethylene diamine tetracetic acid ("EDTA"), hydroxyethylethylenediaminetriacetic acid ("HEDTA"), dicarboxymethyl glutamic acid tetrasodium salt ("GLDA"), diethylenetriaminepentaacetic acid ("DTPA"), propylenediaminetetraacetic acid ("PDTA"), ethylenediaminedi(o-hydroxyphenyl acetic) acid ("EDDHA"), glucoheptonic acid, gluconic acid, sodium citrate, phosphonic acid, salts thereof, and the like. In some embodiments, the chelating agent may be a sodium or potassium salt.

Generally, the chelating agent may be present in an amount sufficient to prevent crosslinking of the viscosity-increasing agent molecules by any free iron (or any other divalent or trivalent cation) that may be present. In one embodiment, the chelating agent may be present in an amount of from about 0.02% to about 5.0% by weight of the treatment fluid. In another embodiment, the chelating agent is present in an amount in the range of from about 0.02% to about 2.0% by weight of the treatment fluid. One of ordinary skill in the art with the benefit of this disclosure will be able to determine the proper concentration of a chelating agent for a particular application.

pH and pH Adjuster

Preferably, the pH of the aqueous continuous aqueous phase of the treatment fluid is in the range of 1 to 10. In acidizing treatments, the pH is preferably less than 4.5.

In certain embodiments, the treatment fluids can include a pH-adjuster. Preferably, the pH adjuster does not have undesirable properties, as discussed above.

The pH-adjuster may be present in the treatment fluids in an amount sufficient to maintain or adjust the pH of the fluid. In some embodiments, the pH-adjuster may be present in an amount sufficient to maintain or adjust the pH of the fluid to a pH in the range of from about 1 to about 4 at the time of introducing into the well.

In general, one of ordinary skill in the art, with the benefit of this disclosure, will recognize the appropriate pH-adjuster and amount thereof to use for a chosen application.

It should be understood that as the degradable polymer degrades, it may release acid. For example, a polylactide may degrade to release lactic acid, which may lower the pH in situ.

Other Well Fluid Additives

In certain embodiments, the treatment fluids also can optionally comprise other commonly used well fluid additives, such as those selected from the group consisting of surfactants, bactericides, other fluid-loss control additives, stabilizers, chelating agents, scale inhibitors, corrosion inhibitors, hydrate inhibitors, clay stabilizers, salt substitutes (such as trimethyl ammonium chloride), relative permeability modifiers (such as HPT-1™ commercially available from Halliburton Energy Services, Duncan, Okla.), sulfide scavengers, fibers, nanoparticles, and any combinations thereof.

Forming Well Fluid

A well fluid can be prepared at the job site, prepared at a plant or facility prior to use, or certain components of the well fluid can be pre-mixed prior to use and then transported to the job site. Certain components of the well fluid may be provided as a "dry mix" to be combined with fluid or other components prior to or during introducing the well fluid into the well.

In certain embodiments, the preparation of a well fluid can be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

Introducing Into Well or Zone

Often the step of delivering a well fluid into a well is within a relatively short period after forming the well fluid, e.g., less within 30 minutes to one hour. More preferably, the step of delivering the well fluid is immediately after the step of forming the well fluid, which is "on the fly."

It should be understood that the step of delivering a well fluid into a well can advantageously include the use of one or more fluid pumps.

In an embodiment, the step of introducing is at a rate and pressure below the fracture pressure of the treatment zone.

In an embodiment, the step of introducing comprises introducing under conditions for fracturing a treatment zone. The fluid is introduced into the treatment zone at a rate and pressure that are at least sufficient to create or extend at least one fracture in the zone.

Allowing Time for Degrading in the Well

After the step of introducing a well fluid comprising a degradable material, the methods can include a step of allowing degradable materials to degrade. This preferably occurs with time under the conditions in the zone of the subterranean fluid. It is contemplated, however, that a clean-up treatment could be introduced into the zone to help degrade the degradable material.

Flow Back Conditions

In an embodiment, the step of flowing back is within 24 hours of the step of introducing. In another embodiment, the step of flowing back is within 16 hours of the step of introducing.

Producing Hydrocarbon from Subterranean Formation

Preferably, after any such well treatment, a step of producing hydrocarbon from the subterranean formation is the desirable objective.

EXAMPLES

To facilitate a better understanding of the present invention, the following examples of certain aspects of some embodiments are given. In no way should the following examples be read to limit, or define, the entire scope of the invention.

A clarified xanthan is commercially available from Halliburton Energy Services, Inc., in Duncan, Okla.

SGA-HT™ is a water-soluble polymeric gelling agent suitable for use in acidic solutions that is commercially available from Halliburton Energy Services, Inc., in Duncan, Okla.

Polylactide degradable polymer particulate was obtained in two sizes, 320 mesh and 150 mesh.

Soy powder, 80 mesh (up to 177 micron particles), having a polydispersity index in the range of 70-80% is commonly available.

A clarified xanthan gel in 1% NaCl solution was prepared as follows:

(1) 1,000 mL of tap water was measured using measuring cylinder and poured into the blender. The fluid was continuously stirred throughout at about 1,000 rpm for uniform mixing of chemicals added.

(2) 10 g of sodium chloride (NaCl) was added to the blender to prepare a 1% NaCl solution.

(3) Desired amount of clarified xanthan powder was added to make 50 lb/Mgal ("50#") or 30 lb/Mgal ("30#") of xanthan gel.

(4) Wait for 30 min for hydration.

(5) Desired amount of polylactide 320 mesh and soy powder 80 mesh was added in mentioned quantity of xanthan gel and thoroughly mixed in the blender.

An acid gel was prepared as follows:

(1) 400 mL of 5%, 10%, or 15% HCl solution prepared in tap water. The acid solution was poured into a blender. The fluid was continuously stirred throughout at about 1,000 rpm for uniform mixing of chemicals added.

(2) 12 mL of SGA-HT™, a viscosity-increasing agent suitable for use in acid, which is commercially available from Halliburton Energy Services, Inc. in Duncan, Okla., was added to the blender to prepare a 3% concentration in the HCl solution.

(3) Stirring continued for about 10 minutes to prepare gelled acid system.

(4) Desired amount of polylactide 320 mesh and soy powder 80 mesh was added and thoroughly mixed in the blender.

The static filtration tests were conducted with only polylactide degradable particulate and polylactide-soy powder blend in two different ways: (1) Constant pressure mode, that is, applying constant pressure for filtration and monitoring the leak-off rate; and (2) Constant flow mode, that is, pumping fluid at a constant flow rate and monitoring change in pressure.

The static fluid-loss tests were performed using HPHT fluid-loss cell. The HPHT fluid-loss cell consists of a sample cell, a heater with controller, provision for nitrogen supply to apply pressure. The sample cell contains a top and bottom cap. A modified top cap was used with stirrer with overhead motor to mix fluids and to avoid particles settling. The provision was made to connect nitrogen supply line to conduct constant pressure experiment and a syringe pump to conduct constant flow experiments. The bottom cap attached to back pressure assembly to apply 200 psi back pressure. The bottom cap houses the filter disc with appropriate pressure seals. The 35-micron and 90-micron filter disc acts as a porous medium that simulates formation rock having a permeability of about 550 mD and 1350 mD respectively. The active area for filtration was 23.3 cm². The test fluid was poured from the top of the preheated sample cell and the top cap was used to seal the sample cell. The fluid was stirred for 15 minutes to avoid particle settling and to allow time for temperature equilibrium. The filtrate was collected in a beaker kept on the weighing balance. The weight data was recorded using data acquisition software.

Constant flow rate tests were carried out by pumping water using syringe pump by isolating nitrogen line.

Constant pressure tests were performed by applying nitrogen pressure to the isolating syringe pump.

A test fluid was prepared by adding 5 gram of polylactide and 5 gram of soy powder in 400 mL of 30# clarified xanthan gel for testing at 200° F. Water was pumped with 25 mL/min using syringe pump in HPHT cell through a 35-micron and 90-micron filter disc and pressure response was monitored. It can be seen from FIG. 1 that initially there was no differential pressure observed for about 0.5 minutes on 35-micron and 2 minutes on 90-micron filter discs, but thereafter a continuous increase in differential pressure can be observed. It shows that polylactide-soy powder blend formed a very good filter cake that is providing the resistance for the fluid to flow and provided very good fluid-loss control.

A test fluid was prepared by adding 10 gm of polylactide particulate and 5 gram of soy powder in 250 mL of 50 lb/Mgal clarified xanthan gel for testing at 200° F. Constant differential pressure 200 and 500 psi applied with $N_2$ gas in HPHT cell through 35-micron filter disc and the rate of filtration was monitored. It can be seen from FIG. 2 that initially there was higher rate of filtration then the leak-off rate was stabilized at 0.19 gram/min. After 30 min of data collection the differential pressure was increased to 500 psi, which then resulted in a constant leak-off rate at 0.44 gram/min. This shows that polylactide-soy powder blend formed a very good filter cake that provides resistance for the fluid to flow and very good fluid-loss control.

The fluid is prepared by adding 8 gm of polylactide particulate and 2 gm of soy powder in 400 mL of 30# clarified xanthan gel for testing at 150° F., 200° F., and 250° F. Constant differential pressure 100 psi applied with $N_2$ gas in the HPHT cell through a 35-micron filter disc and the rate of filtration was monitored. It can be seen from FIG. 3 that initially there was higher rate of filtration then the leak-off rate was stabilized. At 250° F., the cake was stable for about 20 min. This shows that polylactide-soy powder blend formed a very good filter cake that is providing the resistance for the fluid to flow and provided very good fluid-loss control FIG. 4 shows the polylactide-soy blend cake stability at 200° F. and 250° F. for longer time after filtration test. At 200° F., the cake starts degrading after 60 minutes. At 250° F., the cake starts degrading after 20 minutes.

A test fluid is prepared by adding 5 gram of polylactide and 10 gram of soy powder in 400 mL of 3% SGA-HT™ in 5% HCl gelled acid system for testing 200° F. Another fluid composition was prepared by adding 5 gram of polylactide and 15 gram of soy powder in 400 mL of 3% SGA-HT™ in 10% and 15% HCl gelled acid system for testing at 200° F. Constant differential pressure ("DP") of 100 psi was applied with $N_2$ gas in the HPHT cell through a 35-micron filter disc and the rate of filtration was monitored. It can be seen from FIG. 5 that initially there was higher rate of filtration and then the leak-off rate stabilized. The cake was stable for about 20 minutes in case of 5% and 10% HCl gelled acid system and 10 minutes in case of 15% HCl gelled acid system. This shows that polylactide-soy powder blend formed a good filter cake in acid environment too.

FIG. 6 shows the degradation of polylactide 150 mesh or soy powder observed at 250° F. in 5% HCl or water. Soy powder has about 40% initial solubility in water or acid, such that some of its particles, probably the smallest particles, dissolve as soon as mixed with water. Also, we used Whatman No. 4 filter paper, which has a relatively large opening size (20-25 micron) providing relatively fast filtration of smaller particles. Polylactide takes time and temperature to start degradation. From the graphed results in FIG. 6, it can be seen that both materials degrade slightly more quickly in acidic medium than in water medium.

Inspection of the filter cakes formed with polylactide only and with polylactide—soy powder blend on 35-micron disc showed that the soy powder helped in binding the polylactide particles together and to form a much less porous filter cake.

FIG. 7 is a particle size distribution analysis on a semi-logarithmic scale of a 320 mesh polylactide polymer particulate. The smallest size particles are about 50 micrometer and the largest are about 1,000 micrometer. The d(0.1) is about 155 micrometer (meaning that about 10% of the particles are smaller than about 155 micrometer, which is estimated equivalent to about 100 US mesh); the d(0.5) is about 365 micrometer (meaning that about 50% of the particles are smaller than about 365 micrometer or about 45 US mesh); and the d(0.9) is about 669 micrometer (meaning that about 90% of the particles are smaller than about 669 micrometer or about 25-30 US mesh).

FIG. 8 is a particle size distribution analysis on a semi-logarithmic scale of a soy powder. The smallest size particles are about 1 micrometer and the largest are about 300 micrometer. The d(0.1) is about 7 micrometer (meaning that about 10% of the particles are smaller than about 7 micrometer, which is estimated equivalent to about 1200 US mesh);

the d(0.5) is about 47 micrometer (meaning that about 50% of the particles are smaller than about 47 micrometer or about 325 US mesh); and the d(0.9) is about 203 micrometer (meaning that about 90% of the particles are smaller than about 203 micrometer or about 80 US mesh).

It is believed that the particle size distribution of the soy powder, including the smaller particles that are included in soy powder, contribute to building a better filtercake.

Conclusion

Therefore, the present invention is well adapted to attain the ends and advantages mentioned as well as those that are inherent therein.

The particular embodiments disclosed above are illustrative only, as the present invention may be modified and practiced in different but equivalent manners apparent to those skilled in the art having the benefit of the teachings herein. It is, therefore, evident that the particular illustrative embodiments disclosed above may be altered or modified and all such variations are considered within the scope and spirit of the present invention.

The various elements or steps according to the disclosed elements or steps can be combined advantageously or practiced together in various combinations or sub-combinations of elements or sequences of steps to increase the efficiency and benefits that can be obtained from the invention.

The invention illustratively disclosed herein suitably may be practiced in the absence of any element or step that is not specifically disclosed or claimed.

Furthermore, no limitations are intended to the details of composition, design, or steps herein shown, other than as described in the claims.

What is claimed is:

1. A method of treating a treatment zone in a well, the method comprising the steps of:
   (A) forming a treatment fluid comprising:
      (i) a degradable polymer particulate;
      (ii) a legume seed particulate; and
      (iii) a continuous liquid phase; and
   (B) introducing the treatment fluid into the treatment zone of the well.

2. The method according to claim 1, wherein the degradable polymer particulate is biodegradable.

3. The method according to claim 1, wherein the degradable polymer particulate comprises a polylactide.

4. The method according to claim 1, wherein the degradable polymer particulate has a particulate size distribution anywhere between the range of 0.005 millimeter to 5 millimeter.

5. The method according to claim 4, wherein the legume particulate has a particle size distribution anywhere between the range of 0.005 millimeter to 0.5 millimeter.

6. The method according to claim 1, wherein the continuous liquid phase is water-based.

7. The method according to claim 6, wherein the treatment fluid comprises a viscosity-increasing agent.

8. The method according to claim 7, wherein the viscosity-increasing agent is a water-soluble polymer.

9. The method according to claim 8, wherein the water-soluble polymer is selected from the group consisting of xanthan, clarified xanthan, modified xanthan, diutan, clarified diutan, modified diutan, and any combination thereof.

10. The method according to claim 7, wherein the viscosity-increasing agent is crosslinked.

11. The method according to claim 7, wherein the treatment fluid comprises a breaker for the viscosity-increasing agent.

12. The method according to claim 7, wherein the step of introducing the treatment fluid is at a rate and pressure at least sufficient to initiate or extend a fracture in the treatment zone of the well.

13. The method according to claim 6, wherein the water-based continuous liquid phase has a pH less than 4.5.

14. The method according to claim 13, wherein the treatment zone is a carbonate formation.

15. The method according to claim 1, wherein the treatment zone has a permeability in the range of 500 milliDarcy up to 7 Darcy.

16. A method of treating a treatment zone in a well, the method comprising the steps of:
   (A) forming a treatment fluid comprising:
      (i) a degradable polymer particulate, wherein the degradable polymer particulate comprises a polylactide;
      (ii) a legume particulate, wherein the legume particulate comprises soybean; and
      (iii) a continuous liquid phase; and
   (B) introducing the treatment fluid into the treatment zone of the well.

17. A method of treating a treatment zone in a well, the method comprising the steps of:
   (A) forming a treatment fluid comprising:
      (i) a degradable polymer particulate;
      (ii) a legume particulate, wherein the legume particulate comprises soybean; and
      (iii) a continuous liquid phase; and
   (B) introducing the treatment fluid into the treatment zone of the well.

18. A method of treating a treatment zone in a well, the method comprising the steps of:
   (A) forming a treatment fluid comprising:
      (i) a degradable polymer particulate;
      (ii) a legume particulate, wherein the legume particulate has a d(50) that is at least one-half the d(50) of the degradable polymer particulate; and
      (iii) a continuous liquid phase; and
   (B) introducing the treatment fluid into the treatment zone of the well.

19. A method of treating a treatment zone in a well, the method comprising the steps of:
   (A) forming a treatment fluid comprising:
      (i) a degradable polymer particulate;
      (ii) a legume particulate, wherein the d(50) particle size of the legume particulate is smaller than the d(50) particle size of the degradable polymer particulate;
      (iii) a continuous liquid phase that is water-based; and
      (iv) a viscosity-increasing agent; and
   (B) introducing the treatment fluid into the treatment zone, wherein the treatment zone has a permeability in the range of 500 milliDarcy to 7 Darcy and the treatment zone has a natural fractures varying from 0.1 mm to 3 mm width.

20. The method according to claim 19, wherein the water-based continuous liquid phase has a pH less than 4.5.

* * * * *